United States Patent [19]
Cornet

[11] Patent Number: 4,517,574
[45] Date of Patent: May 14, 1985

[54] OPTICAL DISC HUMIDITY PROTECTED

[75] Inventor: Jean Cornet, Paris, France

[73] Assignee: Thomson-CSF, Paris, France

[21] Appl. No.: 477,368

[22] Filed: Mar. 21, 1983

[30] Foreign Application Priority Data

Mar. 23, 1982 [FR] France ............... 82 04915

[51] Int. Cl.³ ............................................ G01D 15/34
[52] U.S. Cl. .............................. 346/135.1; 346/76 L;
346/137; 369/284
[58] Field of Search ..................... 346/135.1, 136, 137,
346/76 L; 369/284

[56] References Cited

U.S. PATENT DOCUMENTS

| | | | |
|---|---|---|---|
| 4,340,655 | 7/1982 | Hollister et al. | 430/14 X |
| 4,353,767 | 10/1982 | Wilkinson | 156/245 X |
| 4,380,016 | 4/1983 | Lehurean et al. | 346/135.1 |
| 4,414,273 | 11/1983 | Wada et al. | 428/336 X |
| 4,442,172 | 4/1984 | Oshima et al. | 428/342 X |

FOREIGN PATENT DOCUMENTS 2437668 9/1978 France .
56-83851 8/1981 Japan ........................ 346/135.1 X

OTHER PUBLICATIONS

Patent Abstracts of Japan, vol. 5, No. 150, (P-81) (822), Sep. 22, 1981, p. 146 P81.

*Primary Examiner*—E. A. Goldberg
*Assistant Examiner*—Gerald E. Preston
*Attorney, Agent, or Firm*—Oblon, Fisher, Spivak, McClelland & Maier

[57] ABSTRACT

A protected optical disc intended for the recording of information is protected against the harmful consequences of humidity by the presence of a hydrophylous material situated at a particular distance from the recording surface, which thus retains a high sensitivity during the write or read operations. The invention may be applied especially to discs intended for digital recording.

27 Claims, 4 Drawing Figures

OPTICAL DISC HUMIDITY PROTECTED

BACKGROUND OF THEE INVENTION

1. Field of the Invention

The present invention relates to a protected optical disc intended for recording information, this information being contained in a write layer formed of a substance sensitive to a radiation.

2. Description of the Prior Art

The disc structures for recording information by an optical method commonly comprise a layer sensitive to a luminous radiation and deposited on a rigid carrier. To protect this sensitive layer against mechanical deterioration liable to be caused by extraneous means, provision has been made to enclose the same between two plates. A first method consists in depositing a thick protective layer over the sensitive layer itself supported by a substrate. This procedure has some substantial shortcomings: The thick protective layer deposited on the sensitive layer causes a drop in sensitivity to the write radiation; on the other hand, the sublimation or decomposition products possibly produced cannot be removed, which impairs the write or recording quality. This led to the production of optical discs protected by another method. This second method consists in establishing an enclosed space in the form of an annular chamber above the sensitive layer, by means of spacers or by a cover shape imparted to one or the other of the elements referred to in the foregoing. This enclosed space may or may not contain a neutral gas.

If the atmosphere contained in the annular chamber is damp, deterioration of the sensitive layer may occur. To prevent the harmful consequences of condensation of the dampness on the sensitive layer, it has been proposed that a protective layer of a polymer or elastomer of a thickness of several tens of microns be placed over the recording surface. The dampness which may be deposited on the top face of the protective layer in the form of droplets does not have a fundamental effect on the recording and playback operations since this face is situated at a distance from the focussing plane, such that it does not appreciably affect the read or write radiation incident on the sensitive layer. A solution of this nature is effective but still affects the sensitivity of the recording layer to a degree amounting to up to 50% of the intensity of the optical radiation because of the mechanical action of the protective layer opposed to the recording mechanism.

SUMMARY OF THE INVENTION

In order to eliminate these shortcomings, the invention proposes that the layer be left uncovered and that one surface of the chamber be lined with a hydrophylous material which absorbs the humidity, thus preventing its condensation on the sensitive layer.

The invention consequently provides a protected optical disc intended for recording information, comprising a casing delimiting an annular chamber containing a layer sensitive to an optical radiation with the layer comprising a recording surface in direct contact with the atmosphere contained in the chamber and being supported by one of the internal surfaces of the casing. The casing has at least one surface permeable with respect to radiation and incorporates protective means intended to counteract degradation of the layer by the atmosphere, wherein the protective means comprise a deposit of hydrophylous material formed on an internal side of the casing without any coverage of the recording surface.

BRIEF DESCRIPTION OF THE DRAWINGS

The invention will now be further described, by way of example, with reference to the accompanying drawings, in which.

DESCRIPTION OF THE PREFERRED EMBODIMENTS

In the case in which the recording and playback of the information are performed by reflection, one of the plates of the protected disc may be opaque and consequently formed by solid metal thus forming a plate impervious to humidity. The other plate is necessarily transparent and is then formed by a plastic material as a rule, which by its very nature is permeable to humidity. If the substrate coated with the sensitive layer is itself produced from a plastic material, a penetration of humidity through the substrate equally occurs via faults of the "pinhole" kind which are unavoidably present in the sensitive layer.

The humidity present in the annular chamber may within a period of greater or lesser length result in condensation on the sensitive layer, if the temperature is lowered below the dewpoint. This dampness may equally act as a catalyst for oxidation of the sensitive layer by the oxygen present in the annular chamber. It may cause mechanical stresses in the sensitive layer during condensation and subsequent evaporation which causes fissuring of the layer if the same is very thin.

Figure 1:
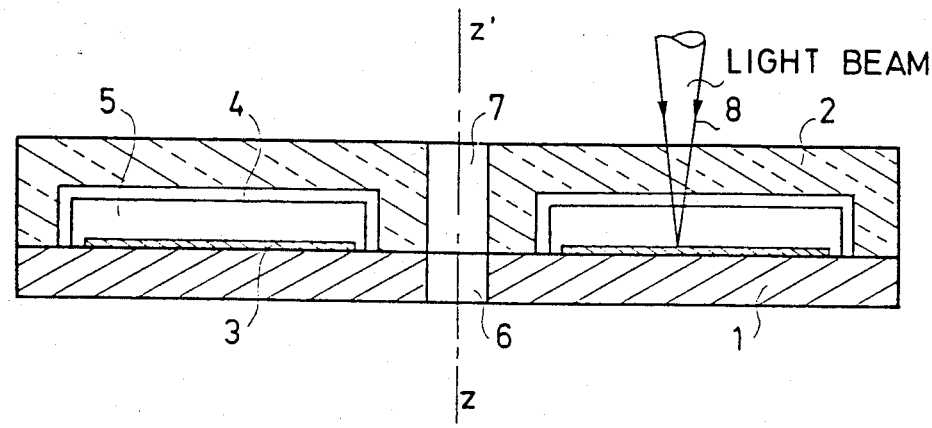
FIG. 1 is a view in cross-section of one embodiment of a protected optical disc in accordance with the invention.

FIG. 1 is a cross-sectional view of a protected optical disc according to the invention. This cross-section has been taken along one of the diameters of the disc. It discloses a preferred embodiment. It will be noted that it comprises a substrate 1 of metal. This may, for example, comprise a rigid aluminium disc of a thickness of 1 to 3 mm centrally pierced by a hole 6 for insertion of a driving spindle of which the axis zz' coincides with the axis of the hole 6. The substrate 1 has undergone a treatment on its internal surface forming a burnished layer in order to ensure the same has a satisfactory plane form. A sensitive layer 3 is deposited on the substrate 1 and forms an annular recording surface centred on the axis zz'. Over the substrate is secured an element 2 in the form of a circular cover pierced at its centre by a hole 7 centered on the axis zz' and of the same diameter as the hole 6. Securing the cover 2 on the substrate 1 delimits a casing comprising an annular chamber 5 above the recording surface. In this embodiment, the substrate being opaque, the optical recording of playback radiation 8 will reach the recording layer through the cover 2 which should consequently be transparent to the optical radiation, and will be reflected partially by the sensitive layer. The cover may be formed from plastic material, for example polyvinyl chloride, and may have a thickness of 1 mm or less. It is sealed or bonded to the substrate 1 via the surfaces of the cover in contact with the substrate. Dampness could consequently penetrate into the annular chamber of the permeable nature of the cover. To counteract this humidity, a hydrophylous material is introduced into the annular chamber. This material is advantageously placed in direct contact with the cover. In FIG. 1, the cover is consequently coated on its internal surface with a hydrophylous coating 4 transparent to the optical radiation. This coating may be formed by a hyrophylous polymer. Because of the presence of a hydrophylous material in the annular chamber 5, and if the temperature is lowered below the dewpoint, a change of state occurs for the humidity present in the form of water vapour, which occurs by a seeding and growth process starting from aqueous nuclei absorbed in the surface of the hydrophylous material and leading to the appearnce of water droplets.

The form of the casing given to the protected optical disc may be determined by a form of a cover given to the plate which does not carry the sensitive layer, as illustrated in FIG. 1.

Figure 2:
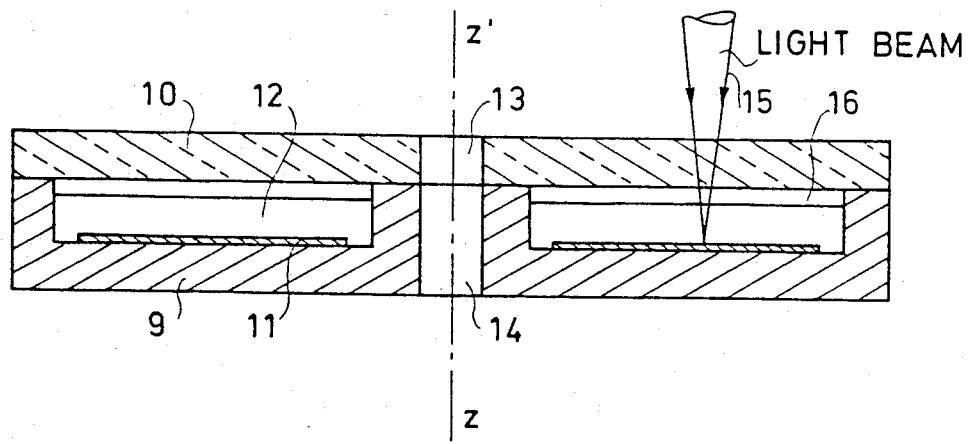
FIGS. 2 and 3 are cross-sectional views of modified forms of a protected optical disc in accordance with the invention.

Another embodiment of the casing consists in giving to the plate bearing the sensitive layer the form of a cover as shown in FIG. 2, being a modified embodiment of a protected optical disc according to the invention. This shape given to the rigid element 9 which may be of aluminium, delimits an annular chamber 12 which is enclosed when the plate 10 covers the rigid element. As in the case of FIG. 1, the sealing element 10 should be transparent to the optical read or write radiation 15 and may be produced from plastic material. The elements 9 and 10, respectively, are centrally pierced by holes 14 and 13 of identical diameter and axis zz', which allow traversal by a driving spindle having the axis zz'. The sensitive layer 11 is deposited on an annular surface on the base of the element 9. In this embodiment, the element 9 being opaque, the playback operation is performed by reflection. The walls of the annular chamber 12 formed by the element 9 which is of metal are impervious to humidity and it is not then necessary to cover these with a hydrophylous material. In this case, the hydrophylous material, for example a polymer, may cover only the surface of the element 10 acting to seal the chamber 12. This material may possibly cover less than this whole surface since it is essentially a material absorbing humidity. A higher efficiency is secured however by coating all the permeable walls with a material of this nature. Polyvinyl alcohol, polyvinyl acetate or nitrocellulose may be utilised as a hydrophylous material.

A method of counteracting dampness is to prevent its penetration through the permeable walls. To this end, all these walls may be coated with a material which is a barrier to humidity. An efficient coating is formed by a metal layer of which the thickness is selected to be sufficiently small, at least in the sections liable to be traversed by the optical read or write radiation, so that the transmission of the optical radiation is not impeded appreciably. To be efficient, this layer should however have a thickness of at least 50 Å. The thickness may be as great as wished in the sections which are not traversed by the optical radiation. In a preferred embodiment, the metal humidity barrier layer covering the area swept by the said optical radiation is selected to be of a non-oxidisable nature or to be oxidisable only to a very low degree in such a manner that its optical properties (transmittance and reflectance) are constant in time and the read and write operations are not impeded by a possible oxidisation of this layer. This coating may be produced by vaporization and may be formed from an alloy based on gold, silver, platinum or palladium, by an alloy between these elements or by any one of these elements.

The humidity barrier material may be an amorphous and insulating and thus non-oxidisable material, for example an amorphous semiconductor. Use may, for example, be made of a coating of 300 Å of selenium-base glass providing a forbidden band width sufficient to prevent appreciable absorption of the photons of the read or write optical radiation. Another usable material is a semiconductor arsenic-base glass.

Figure 3:
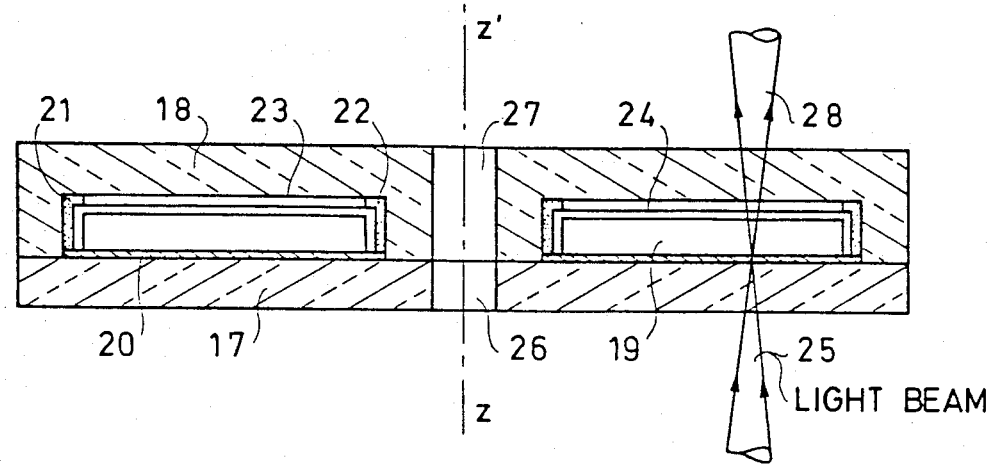

FIG. 3 is a cross-sectional view of a modified form of the protected optical disc comprising a barrier layer against humidity. The example selected relates to a disc readable by transmission and consequently requiring transparency of the substrate carrying the sensitive layer, but the invention may be applied to any protected optical disc. FIG. 3 discloses a protected optical disc having geometrical features similar to those of FIGS. 1 and 2. The protected optical disc has the form of a casing delimited by the substrate 17 and the cap-like element 18 and defining an annular chamber 19. The disc has a symmetry axis zz' which is that of the holes 26 and 27 which permit traversal by a driving spindle. The substrate 17 is transparent and is formed, for example, by a polyvinyl chloride disc of a thickness of say 1.5 mm, and carries a secsitive layer 20 which may be inscribed and read by optical means. Whilst accepting that the layer 20 prevents humidity from penetrating into the chamber 19 through the substrate 17, it is appropriate to protect the other surface of the casing. The cover 18 is coated on its internal surface with a humidity barrier layer 23 extending over an area liable to be traversed by the optical read radiation 28 resulting from an incident radiation 25 modulated by the information contained in the sensitive layer 20. The layer 23 is of the kind described in the foregoing. The areas of the cover which are not traversed by the optical read radiation have been coated with a layer of an easily oxidisable material allowing the sensitive layer to be protected against attacks by oxygen. This layer of oxidisable material acts as an oxygen getter and may be selected as thick as need be to protect the sensitive layer throughout the life period required for the recording medium. This easily oxidisable layer may be formed by an organic layer containing metal particles or unsaturated metal oxides in suspension, for example a red lead paint. It is observed in FIG. 3 that this coating has been applied in two concentric rings 21 and 22 on the areas of the internal surface left uncovered by the humidity barrier material. The internal surface of the cover was then covered by a hydrophylous material 24 of the kind described in the foregoing. This material is permeable to oxygen and consequently does not prevent the action of oxygen on the oxidisable material.

Figure 4:
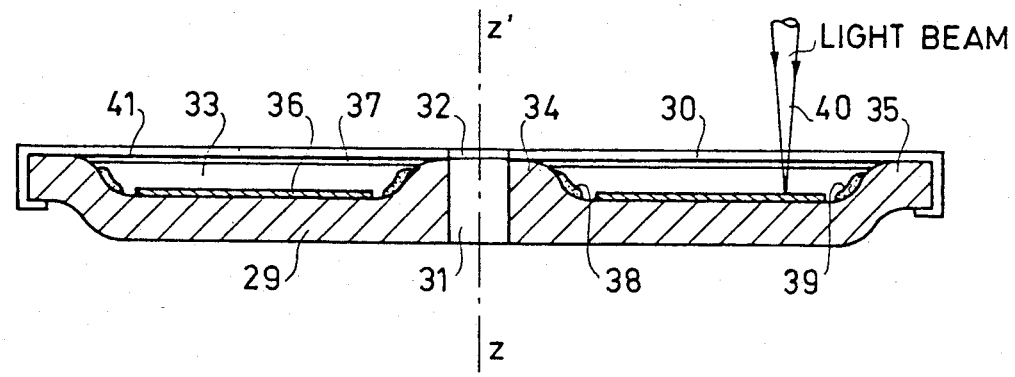
FIG. 4 is a cross-sectional view of a protected optical disc comprising a thin sealing film.

The advantage of the invention is that it may be applied to any kind of optical disc which is protected and has an annular chamber above the recording surface. It is applicable in particular to protected optical discs having a sealing element in the form of a thin film like that depicted in FIG. 4. This device comprises a rigid element 29 which may be of aluminium. This element is circular and produced in the form of a cap or dish. Its base has a plane surface which receives a sensitive layer 36. The element 29 is pierced by a central hole 31 having the axis zz' coinciding with the axis of the driving spindle. A flexible element 30 formed by a thin film of transparent plastic material is lightly tensioned over the edges 34 and 35 of the rigid element 29. The upper surface of these edges provides the junction between the elements 29 and 30 established along two co-planar conventric rings having the axis zz'. As shown in FIG. 4, the flexible element 30 may be bent towards the underside of the rigid element to provide a better seal for the annular chamber 33. If need be, the flexible element 30 is pierced by a central hole 32 to allow traversal by the driving spindle. Because of its thin gauge (at most a few tenths of a millimeter), the film 30 is comparatively pervious to humidity and the invention applies in particularly in this case. The internal surface of the film 30 is coated on the surface closing off the annular chamber 33 with a layer 37 of hydrophylous material of the kind already described and transparent to an optical write or read radiation 40. The thickness of the layer 37 is of the order of 0.1 to 100 microns. The interface between the film 30 and layer 37 is formed by a layer 41 of a humidity barrier material, for example a coating of say 50 Å thickness deposited by vaporization. The rigid element 29 also carries a deposit of easily oxidisable material. For example, this deposit is produced in the form of two concentric rings 38 and 39 centred on the axis zz'. They may be produced from a more electropositive metal than the metal used in forming the sensitive layer, for example zinc or manganese deposited by vapourisation or by an electrochemical process.

The presence of a coating impervious to humidity and which in the presence of the hydrophylous layer assures the absence of condensate on the sensitive layer, has been described in the preceding description. It was discovered experimentally that the mere presence of a coating impervious to humidity makes it possible to ensure the disc casing has an unalterable form in the case in which this casing is in two parts produced from hygroscopic materials. As a matter of fact, without this coating, one only of the parts of the casing is provided with a humidity barrier formed by the sensitive layer. This leads to saturation of this part, with a greater risk of shrinkage or swelling than for the other part. So that the two parts of the casing may be equalised dimensionally, it is advantageous to provide the part which does not bear the sensitive layer with a very thin impervious coating acting as a humidity barrier. Thus, when the atmospheric or thermal conditions change, the disc casing undergoes similar dimensional changes preventing any warping of the surface bearing the sensitive layer. This coating is particularly useful if the casing elements are produced from methylpolymethacrylate.

The invention equally applies to any other protected optical disc in the form of a casing, in particular to devices in which the annular chamber is formed by two panels in the form of flat discs separated by concentric circular spacers.

The invention consequently makes it possible to produce optical discs of which the sensitive layer is protected from dust and abrasive damage as well as against humidity and oxidisation whilst retaining high sensitivity during the read and write operations.

I claim:

1. A protected optical disc intended for recording information, comprising:
   a casing having walls delimiting a chamber containing a layer sensitive to an optical radiation, said layer comprising a recording surface exposed to an atmosphere filling said chamber and carried by one of said walls, said casing being permeable to said optical radiation along at least one of said walls and another of said walls is coated with a surface condensate producing means having a water vapor hydrophylous surface exposed to said atmosphere, said hydrophylous surface having aqueous nuclei forming seeding sites for the growth of water droplets corresponding to deposition of humidity from said atmosphere below its dew point.

2. A protected optical disc intended for recording information comprising a casing having a plurality of wall portions bounding a chamber containing along one of said wall portions a sensitive layer impervious to humidity;
   said sensitive layer interacting with optical reading and recording radiation and comprising a top surface in direct contact with the atmosphere filling said chamber with said casing being permeable to said radiation;
   a further one of said wall portions overlying both said top surface and said atmosphere having its inner face lined with a coating impervious to humidity and situated at a distance from the sensitive layer contained within said casing.

3. A protected optical disc as claimed in one of claims 1 or 2, wherein said casing is made of a dish shaped rigid body having edges and said casing further comprises a thin flexible film of transparent plastic material lightly tensioned over said edges.

4. A protected optical disc as claimed in claim 3, wherein the rim portion of said film is bent around said edges to provide an improved seal for said chamber.

5. An optical disc according to claim 1, wherein said surface condenste producing means includes a hydrophylous polymer.

6. An optical disc according to claim 5, wherein said hydrophylous polymer is polyvinyl alcohol.

7. An optical disc according to claim 5, wherein said hydrophylous polymer is polyvinyl acetate.

8. An optical disc according to claim 5, wherein said hydrophylous polymer is nitrocellulose.

9. An optical disc according to claim 1, wherein said surface condensate producing means comprise a humidity barrier coating, said coating being able to cover all the surfaces of the casing not coated by the sensitive layer and being essentially transparent to the optical radiation in the parts traversed by this radiation.

10. An optical disc according to claim 9, wherein said humidity barrier coating is formed by a layer of material which is unaffected or but slightly affected by said atmosphere.

11. An optical disc according to claim 10, wherein said unaffected material is formed by a metal layer.

12. An optical disc according to claim 11, wherein said metal layer is a gold layer.

13. An optical disc according to claim 11, wherein said metal layer is a gold-based alloy.

14. An optical disc according to claim 10, wherein said unaffected material is an amorphous insulating material.

15. An optical disc according to claim 14, wherein said unaffected material is a semiconductor glass having a forbidden bandwidth such that said optical radiation is not absorbed or absorbed only slightly.

16. An optical disc according to claim 15, wherein said semiconductor glass is arsenic-based.

17. An optical disc according to claim 15, wherein said semiconductor glass is selenium-based.

18. An optical disc according to claim 1, wherein said surface condensate producing means comprise an easily oxidisable material.

19. An optical disc according to claim 18, wherein said easily oxidisable material is a more electropositive metal that the metal playing a part in forming said sensitive layer.

20. An optical disc according to claim 2, wherein said layer impervious to humidity is transparent to the optical radiation.

21. An optical disc according to claim 2, wherein said coating impervious to humidity is formed by a layer of metal.

22. An optical disc according to claim 21, wherein said layer of metal is a layer of gold.

23. An optical disc according to claim 21, wherein said layer of metal is a gold-based alloy.

24. An optical disc according to claim 2, wherein said coating impervious to humidity is formed by a layer of material unalterable in the presence of said atmosphere.

25. An optical disc according to claim 2, wherein said coating impervious to humidity is a semiconductor glass having a forbidden band amplitude such that said optical radiation is not absorbed.

26. An optical disc according to claim 25, wherein said semiconductor glass is arsenic-based.

27. An optical disc according to claim 25, wherein said semiconductor glass is selenium-based.

* * * * *